US012370128B2

(12) United States Patent
Sheftel et al.

(10) Patent No.: US 12,370,128 B2
(45) Date of Patent: Jul. 29, 2025

(54) BABY BOTTLE SYSTEM

(71) Applicants: Kara S. Sheftel, Manchester, CT (US); Cortney Charnas Cole, Simsbury, CT (US)

(72) Inventors: Kara S. Sheftel, Manchester, CT (US); Cortney Charnas Cole, Simsbury, CT (US)

( * ) Notice: Subject to any disclaimer, the term of this patent is extended or adjusted under 35 U.S.C. 154(b) by 0 days.

(21) Appl. No.: 17/500,015

(22) Filed: Oct. 13, 2021

(65) Prior Publication Data

US 2022/0110833 A1 Apr. 14, 2022

Related U.S. Application Data

(60) Provisional application No. 63/091,463, filed on Oct. 14, 2020.

(51) Int. Cl.

| | |
|---|---|
| ***A61J 11/04*** | (2006.01) |
| ***A45F 3/16*** | (2006.01) |
| ***A61J 7/00*** | (2006.01) |
| ***A61J 9/06*** | (2006.01) |
| ***A61J 9/08*** | (2006.01) |
| ***A61J 11/00*** | (2006.01) |
| ***B65D 41/26*** | (2006.01) |

(52) U.S. Cl.

CPC ................. *A61J 11/04* (2013.01); *A45F 3/16* (2013.01); *A61J 7/0046* (2013.01); *A61J 9/0638* (2015.05); *A61J 9/08* (2013.01); *A61J 11/008* (2013.01); *A61J 11/045* (2013.01); *B65D 41/26* (2013.01)

(58) Field of Classification Search

CPC ... A61J 11/04; A61J 11/008; A61J 9/08; A61J 7/0046; A61J 2200/46; A45F 3/16; A47J 11/02; B65D 41/26

See application file for complete search history.

(56) References Cited

U.S. PATENT DOCUMENTS

| | | | | | |
|---|---|---|---|---|---|
| 525,753 | A * | 9/1894 | Turner | B65D 41/26 141/381 |
| 1,280,700 | A * | 10/1918 | Fouche | B65D 41/26 141/381 |
| 2,889,064 | A * | 6/1959 | Kurkjian | A61J 11/02 215/11.1 |
| 4,623,068 | A * | 11/1986 | Brown | A61J 11/008 215/11.4 |
| 4,685,577 | A * | 8/1987 | Chen | A61J 9/04 215/11.4 |
| 5,024,341 | A * | 6/1991 | Dekerle | A61J 11/04 D9/557 |
| 5,993,479 | A * | 11/1999 | Prentiss | A61J 9/00 606/236 |

(Continued)

*Primary Examiner* — Nathan J Jenness
*Assistant Examiner* — Jennifer Castriotta
(74) *Attorney, Agent, or Firm* — McCormick, Paulding & Huber PLLC

(57) ABSTRACT

A baby bottle system includes a collar configured to connect to a disposable water bottle, a nipple secured to the collar, and a dosing cap configured to connect to the collar and enclose the nipple. The collar includes a lower portion configured to engage the disposable water bottle and an upper portion attached to the lower portion, a base of the nipple being sandwiched between the upper portion and an upper end of the lower portion to secure the nipple to the collar.

15 Claims, 15 Drawing Sheets

(56) References Cited

U.S. PATENT DOCUMENTS

| | | | | |
|---|---|---|---|---|
| 6,354,449 | B1 * | 3/2002 | Smith | A61J 11/04 215/11.1 |
| 6,415,937 | B1 * | 7/2002 | DeJong | A61J 11/04 215/11.1 |
| 6,851,565 | B2 * | 2/2005 | Stephan | A61J 11/04 215/11.1 |
| 2006/0151420 | A1 * | 7/2006 | Espenschied | A61J 11/04 215/276 |
| 2011/0155684 | A1 * | 6/2011 | Sirota | A61J 9/04 215/11.5 |
| 2013/0071144 | A1 * | 3/2013 | Shi | B65D 39/04 399/258 |
| 2014/0291272 | A1 * | 10/2014 | Weil | A61J 9/00 215/11.5 |
| 2015/0122764 | A1 * | 5/2015 | Freeman | A61J 9/008 215/11.1 |
| 2019/0133889 | A1 * | 5/2019 | Roe | B65D 43/021 |

* cited by examiner

BABY BOTTLE SYSTEM

CROSS-REFERENCE TO RELATED APPLICATIONS

This application claims priority to U.S. Provisional Patent Application No. 63/091,463 filed Oct. 14, 2020, which is hereby incorporated by reference herein in its entirety.

TECHNICAL FIELD

This present disclosure relates to baby bottles for feeding infants and toddlers.

BACKGROUND

Baby bottles for delivering milk, formula and the like to infants and toddlers are well known in the art. These known baby bottles can make traveling with an infant or toddler difficult for a variety of reasons. For instance, traveling with milk or formula in such a conventional baby bottle can be problematic because the milk or formula within the baby bottle must be kept refrigerated prior to use to prevent spoilage. Additionally, traveling by air with milk or formula in a conventional baby bottle can add additional difficulty and screening time because airport security may require testing of the milk or formula within the baby bottle.

SUMMARY

The present disclosure provides a baby bottle system that overcomes the shortcomings of the conventional baby bottles mentioned above. The baby bottle system comprises a collar having a lower end configured to connect to a water bottle, a nipple secured to an upper end of the collar, and a dosing cap configured to connect to the collar and enclose the nipple.

According to the present disclosure, the collar may comprise a lower portion having threads configured to engage corresponding threads on the water bottle, and an upper portion attached to the lower portion. A base of the nipple may be sandwiched between the upper portion and an upper end of the lower portion to secure the nipple to the collar. The upper end of the lower portion may include a sealing projection that engages the base of the nipple to form a water-tight seal.

According to the present disclosure, an outer surface of the lower portion may include at least one engagement feature, and an inner surface of the upper portion may include at least one complementary engagement feature, the at least one engagement feature and the at least one complementary engagement feature interacting to connect the upper portion to the lower portion. The at least one engagement feature may include a circumferential ridge extending around the circumference of the outer surface of the lower portion, and the at least one complementary engagement feature may include a circumferential indentation extending around the circumference of the inner surface of the upper portion. The at least one engagement feature may include a plurality of projections extending outward from the outer surface of the lower portion, and the at least one complementary engagement feature may include a plurality of indentations formed in the inner surface of the upper portion.

According to the present disclosure, the lower portion of the collar may include a bottle stop configured to sealingly engage an upper end of the water bottle when the lower portion is fully threaded onto the water bottle.

According to the present disclosure, an inner surface of the dosing cap may include an engagement feature formed proximate to an open end of the dosing cap, and an outer surface of the upper portion of the collar may include a corresponding engagement feature, the engagement feature and the corresponding engagement feature interacting to connect the dosing cap to the collar. The engagement feature may include a circumferential ridge, and the corresponding engagement feature may include a circumferential indentation.

These and other objects, features and advantages of the present disclosure will become apparent in light of the detailed description of embodiments thereof, as illustrated in the accompanying drawings.

DETAILED DESCRIPTION

Figure 1:
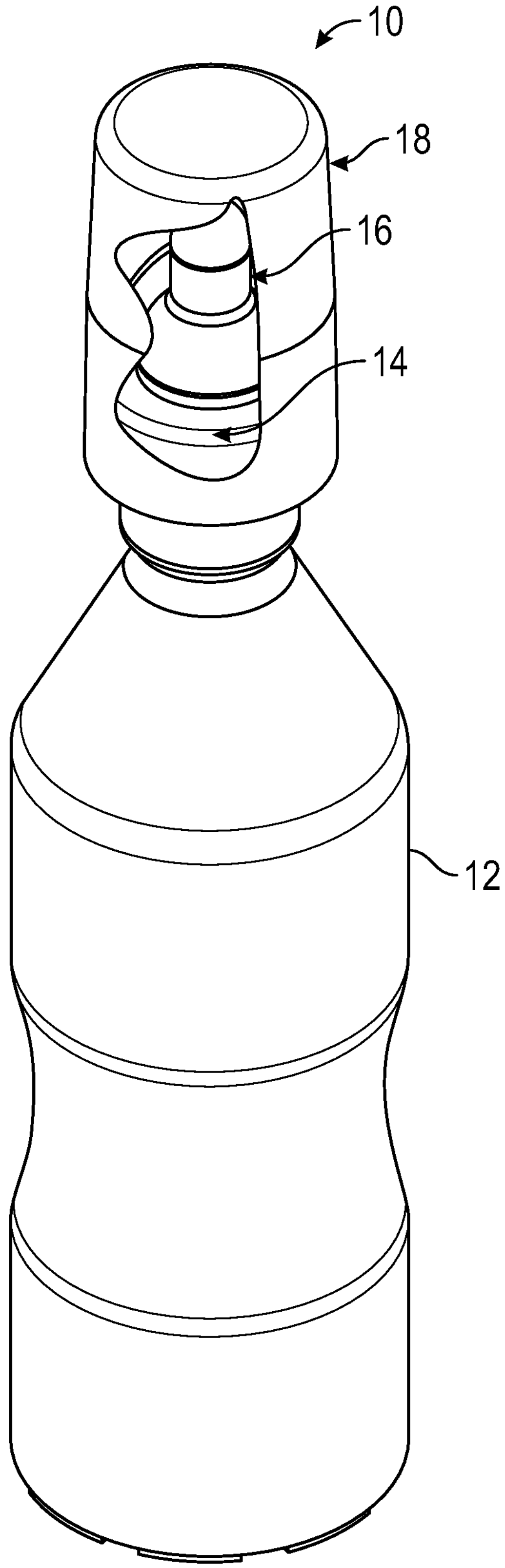
FIG. 1 is a partial cut-away front top isometric view of a baby bottle system according to the present disclosure.

Before the various embodiments are described in further detail, it is to be understood that the invention is not limited to the particular embodiments described. It will be understood by one of ordinary skill in the art that the baby bottle described herein may be adapted and modified as is appropriate for the application being addressed and that the components of the baby bottle described herein may be employed in other suitable applications, and that such other additions and modifications will not depart from the scope thereof.

In the drawings, like reference numerals refer to like features. Accordingly, although certain descriptions may refer only to certain figures and reference numerals, it should be understood that such descriptions might be equally applicable to like reference numerals in other figures.

Figure 2:
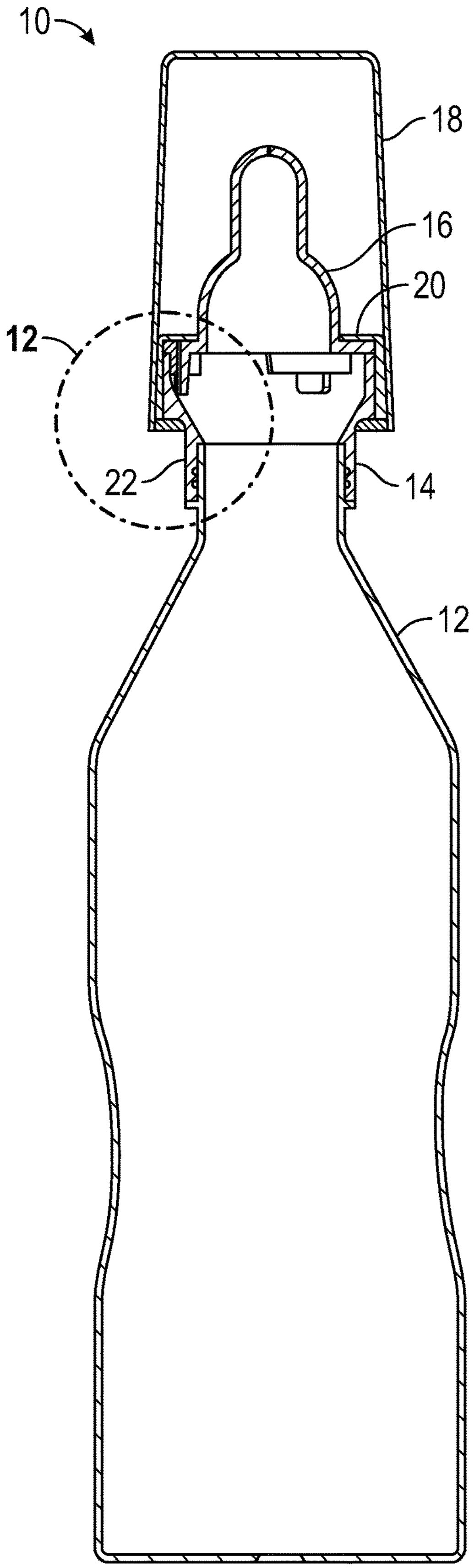
FIG. 2 is a front, cross-sectional view of the baby bottle system of FIG. 1.

Referring to FIGS. 1-2, a baby bottle system 10 according to the present disclosure is shown secured to a water bottle 12. The baby bottle system 10 includes a collar 14 configured to connect to the water bottle 12, a nipple 16 secured to an upper end of the collar 14, and a dosing cap 18 configured to connect to the collar 14 and enclose the nipple 16 therein. The collar 14 includes an upper member 20 and a lower member 22 that connect to one another to secure the nipple 16 to the collar 14, as will be discussed in greater detail below. The water bottle 12 may be a commercially available disposable water bottle, such as those commonly available at grocery stores, convenience stores, fast food restaurants, vending machines and the like.

Figure 4:
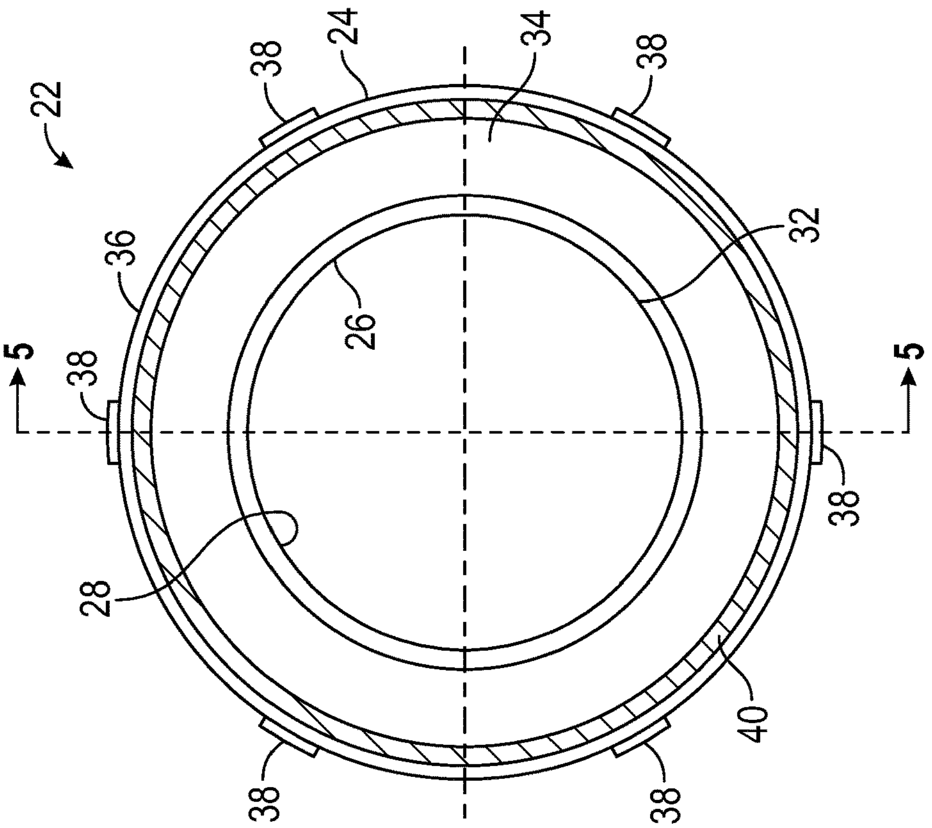
FIG. 4 is a top view of the lower collar member of FIG. 3.
Figure 3:
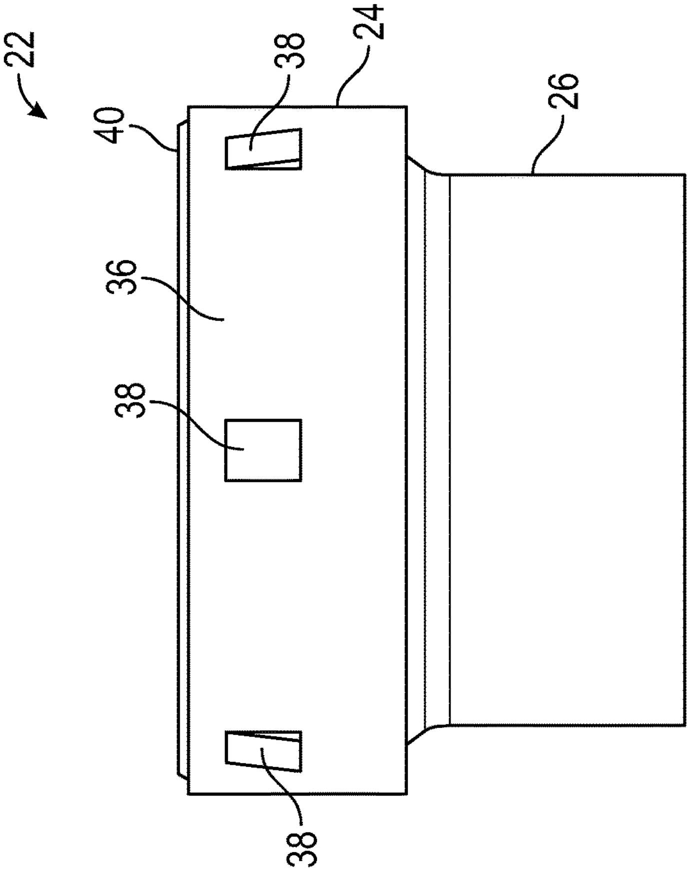
FIG. 3 is a front view of a lower collar member of the baby bottle system of FIG. 1.
Figure 5:
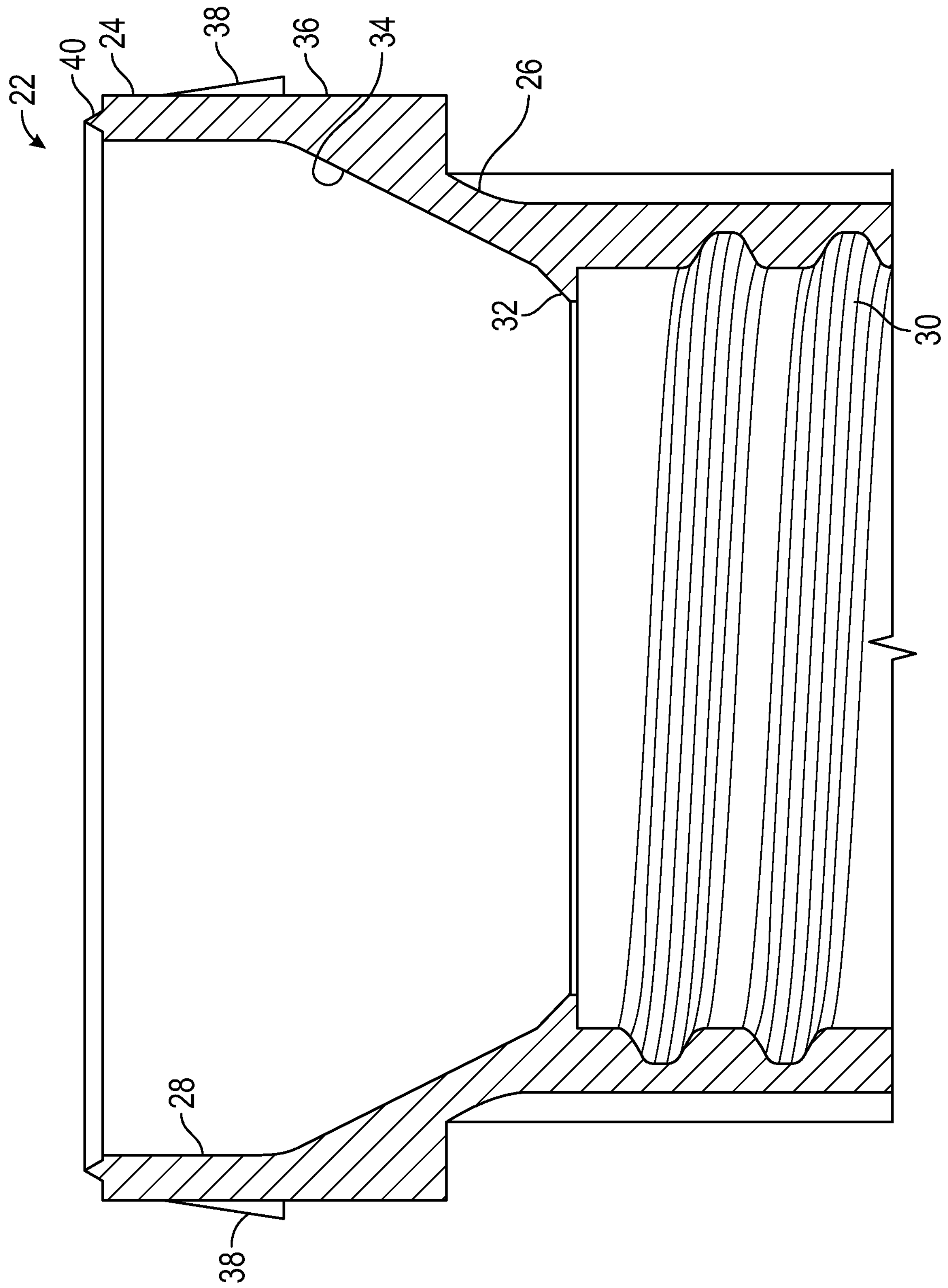
FIG. 5 is a front cross-sectional view of the lower collar member of FIG. 3.

Referring to FIGS. 3-5, the lower collar member 22 has a body including an upper ring 24 and a lower neck 26 extending downward from the upper ring 24. The upper ring 24 and lower neck 26 have interior surfaces that define a central passage 28 that extends through the body from the lower end to the upper end. As seen in FIG. 5, the interior surface of the lower neck 26 includes a female thread pattern 30 sized to correspond to a male thread pattern surrounding the mouth of the water bottle 12, shown in FIG. 2, which typically allows a cap to be secured to the water bottle 12 prior to purchase. The female thread pattern 30, thus, allows the lower collar member 22 to be screwed onto and attached to the water bottle 12. The lower neck 26 may also include a stop 32 projecting radially inward at an upper end of the thread pattern 30 to facilitate proper engagement between the lower collar member 22 and the water bottle 12 when the lower collar member 22 is attached to the water bottle 12. The central passage 28 may include an outwardly angled transition region 34 between the female thread pattern 30 and the upper end of the body so that the opening of the central passage 28 at the upper end of the body is larger than the opening at the lower end of the body, the opening at the lower end of the body being defined by the mouth of the water bottle 12.

The upper ring 24 of the lower collar member 22 has a cylindrical outer surface 36 with a plurality of securing features 38 disposed around the periphery of the outer surface 36. For instance, as illustrated, the securing features 38 include six equally spaced tabs projecting outward from the cylindrical surface 36. It should be readily understood by those skilled in the art that other types and numbers of securing features 38 are within the scope of the present disclosure. The upper ring 24 also includes a sealing projection 40 at an upper end thereof, the sealing projection 40 surrounding the opening of the central passage 28 at the upper end of the lower collar member 22.

Figure 6:
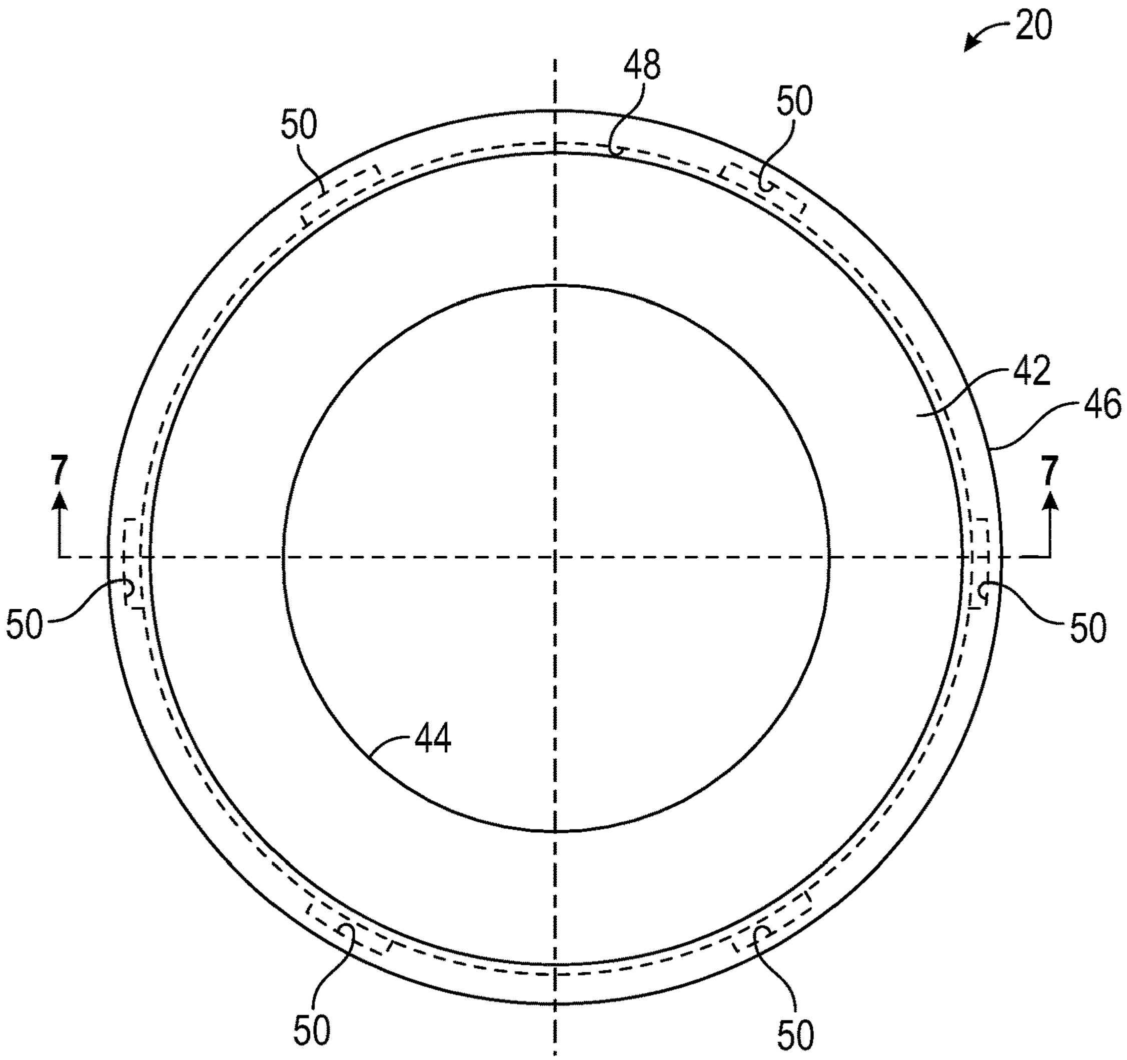
FIG. 6 is a top view of an upper collar member of the baby bottle system of FIG. 1.
Figure 7:
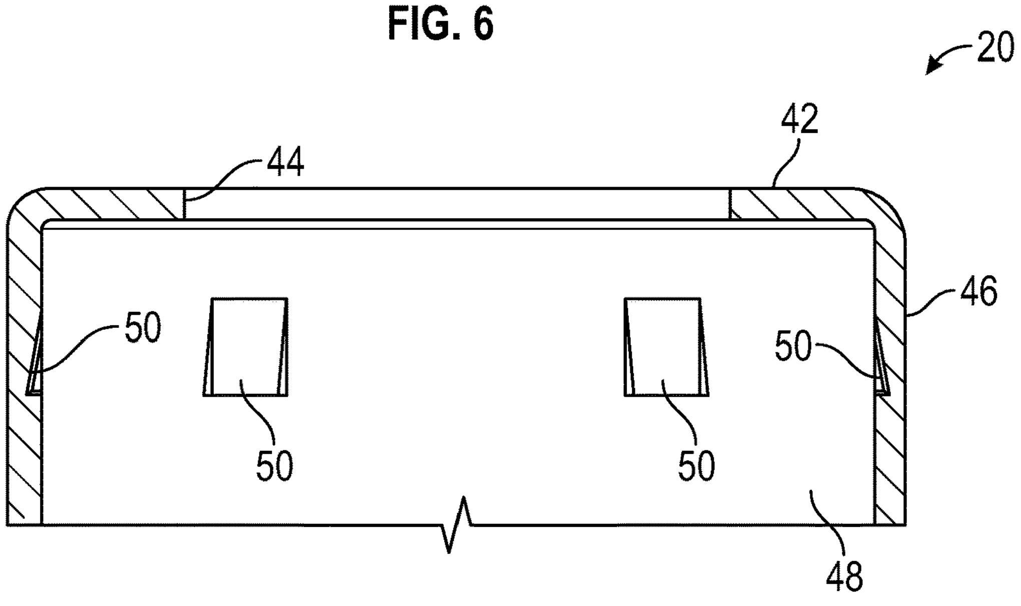
FIG. 7 is a front cross-sectional view of the upper collar member of FIG. 6.

Referring to FIGS. 6 and 7, the upper collar member 20 has a flat disc-shaped upper wall 42 with a central opening 44 extending therethrough, and a cylindrical sidewall 46 extending downward from the upper wall 42 at the periphery thereof. The cylindrical sidewall 46 includes a smooth inner surface 48 with a plurality of complementary securing features 50 formed therein, the plurality of complementary securing features 50 corresponding in form and number to the securing features 38 of the lower collar member 22, shown in FIGS. 3-5. For instance, as illustrated, the plurality of complementary securing features 50 includes six equally spaced slots or cavities formed in the inner surface 48. It should be readily understood by those skilled in the art that other types and numbers of complementary securing features 50 are within the scope of the present disclosure.

Figure 8:
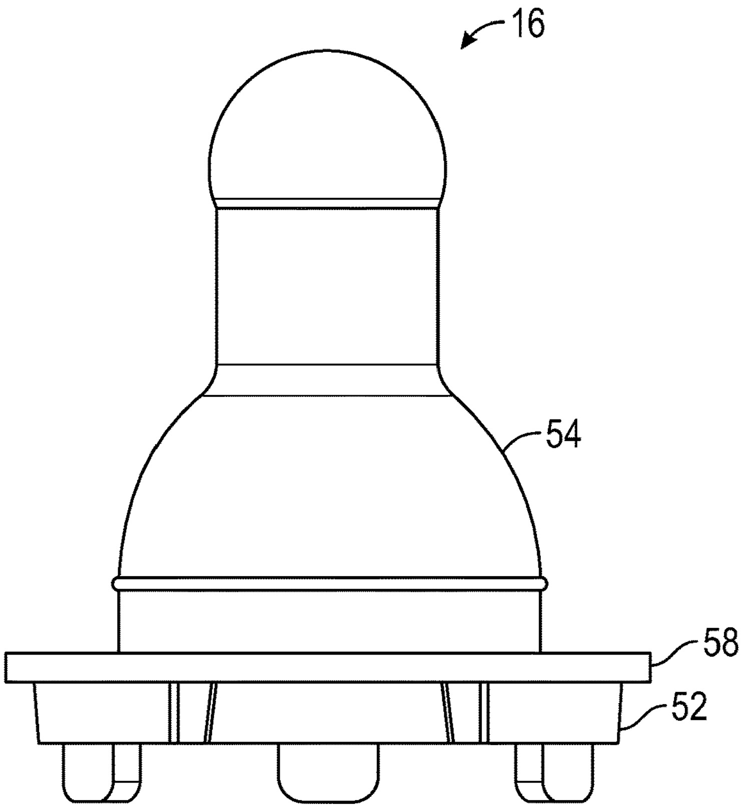
FIG. 8 is a front view of a nipple of the baby bottle system of FIG. 1.
Figure 9:
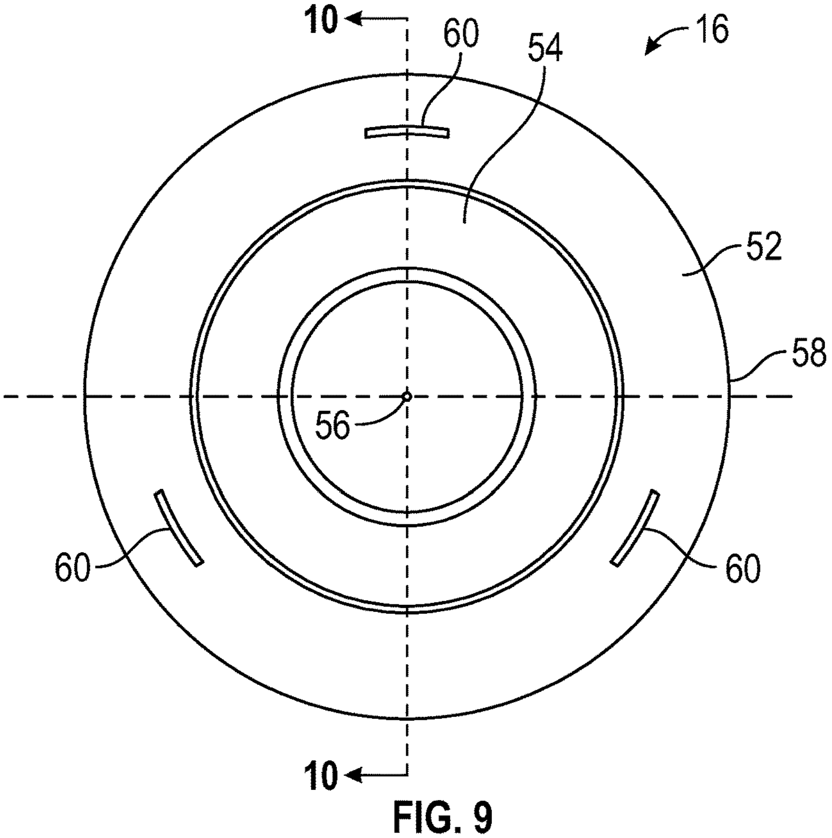
FIG. 9 is a top view of the nipple of FIG. 8.
Figure 10:
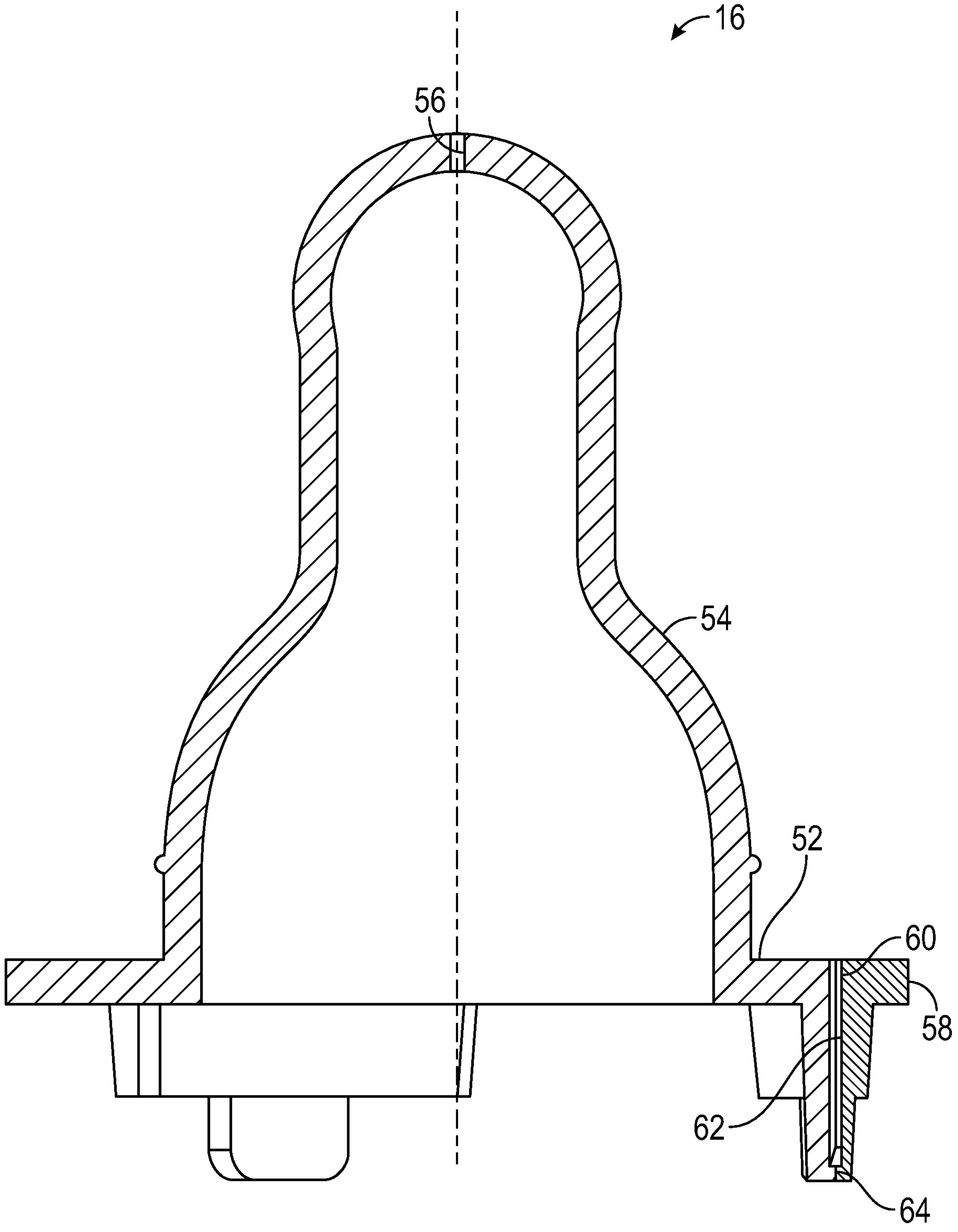
FIG. 10 is a left-hand side cross-sectional view of the nipple of FIG. 8.

Referring to FIGS. 8-10, the nipple 16 includes a base portion 52 and a sucking portion 54 and is formed of a flexible material as is known in the art of baby bottles. The sucking portion 54 is generally hollow and includes a passage 56 extending through a tip of the sucking portion 54 to allow fluid to be drawn through the passage 56 in response to sucking of the sucking portion 54, for example, by an infant or toddler. The base portion 52 includes a flat flange 58 extending outward from a base of the sucking portion 54. The base portion 52 also has at least one air vent 60 formed therethough and configured to allow air to pass through the nipple 16 and into the water bottle 12 during use while fluid is being drawn through the passage 56. For instance, as illustrated in FIG. 9, the base portion 52 may include three air vents 60 formed therethrough. The three air vents 60 may be formed as slits that are equally spaced about the sucking portion 54. As seen in FIG. 10, each air vent 60 may include a larger passage portion 62 on the exterior side and a smaller passage portion 64 on the interior side to inhibit or prevent fluid within the water bottle 12 from passing through the air vent 60.

Figure 11:
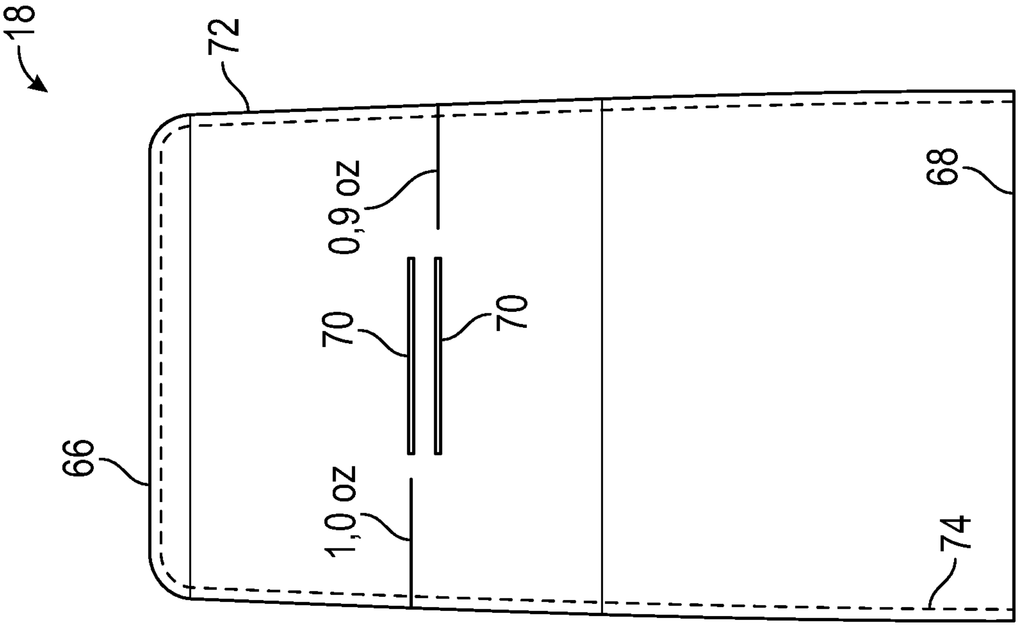
FIG. 11 is a front view of a dosing cap of the baby bottle system of FIG. 1.

Referring to FIG. 11, the dosing cap 18 has a hollow body 66 with an opening 68 at a bottom of the hollow body 66, thereby allowing the dosing cap 18 to function as a cup when inverted. The dosing cap 18 is preferably formed from a transparent or semi-transparent material and includes one or more volume gradations 70 marked on an outer surface 72 of the dosing cap 18, the one or more volume gradations 70 providing measurements of volume within the dosing cap 18 when the dosing cap 18 is inverted and functioning as a cup. Alternatively, the dosing cap may be made of a non-transparent material and/or the one or more volume gradations 70 may be marked on an interior surface 74 of the dosing cap 18, with measurements being viewed through the opening 68. A portion of the interior surface 74 of the dosing cap 18 is configured to slidingly engage an outer surface of the upper collar member 20 to enclose the nipple 16 therein, as shown in FIGS. 1 and 2.

Figure 12:
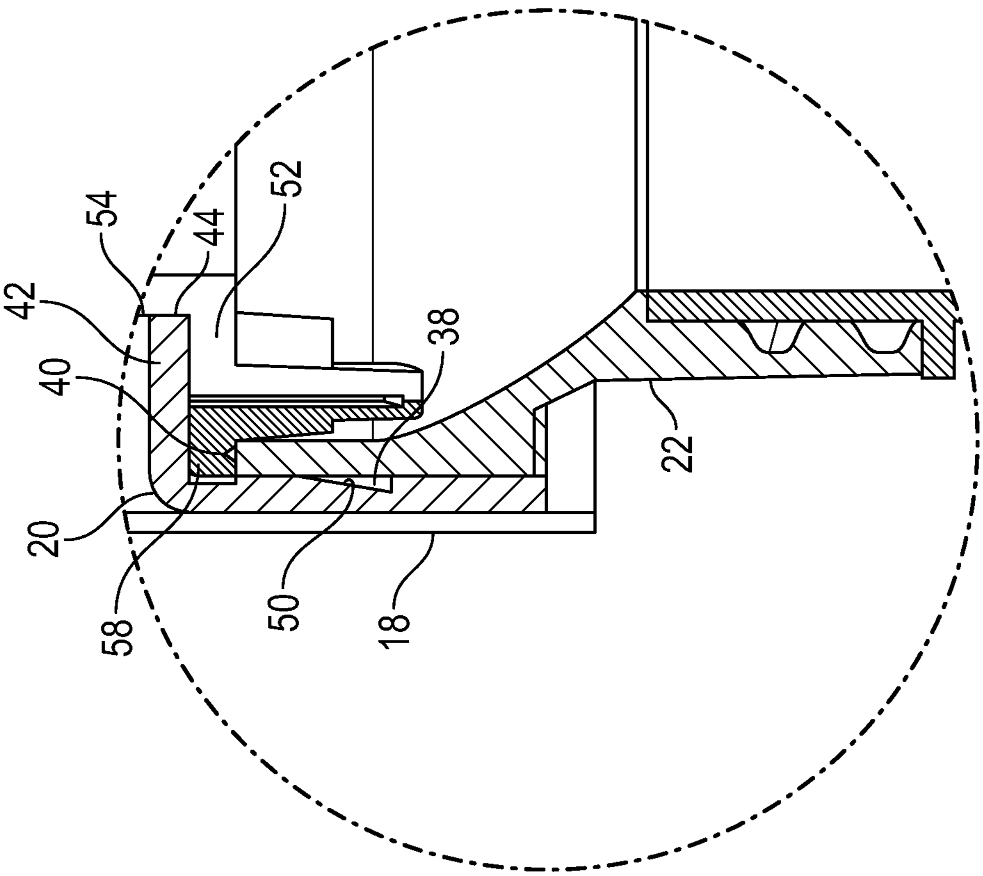
FIG. 12 is an enlarged cross-sectional view of a portion of the baby bottle system of FIG. 2.

Referring back to FIG. 2 and also to FIG. 12, the baby bottle system 10 according to the present disclosure is assembled by passing the sucking portion 54 of the nipple 16 upward through the central opening 44 of the upper collar member 20 of the collar 14 until an upper surface of the base portion 52 of the nipple contacts the bottom surface of the upper wall 42 of the upper collar member 20. The lower collar member 22 is then inserted into the upper collar member 20 until the securing features 38 on the lower collar member 22 engage the complementary securing features 50 of the upper collar member 20, thereby securing the lower collar member 22 to the upper collar member 20. This sandwiches the flange 58 of the nipple 16 between the lower collar member 22 and the upper collar member 20 and causes the sealing projection 40 at the upper end of the lower collar member 22 to project into the flange 58 of the nipple 16, thereby securing the nipple to the collar 14. The dosing cap 18 slidingly engages an outer surface of the upper collar member 20 to enclose the nipple 16 therein.

Figure 14:
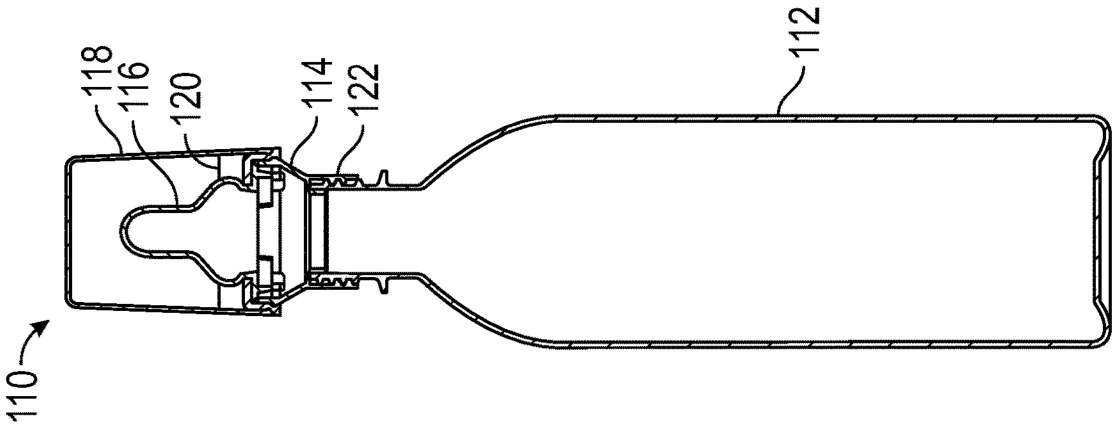
FIG. 14 is a front, cross-sectional view of the baby bottle system of FIG. 13.
Figure 13:
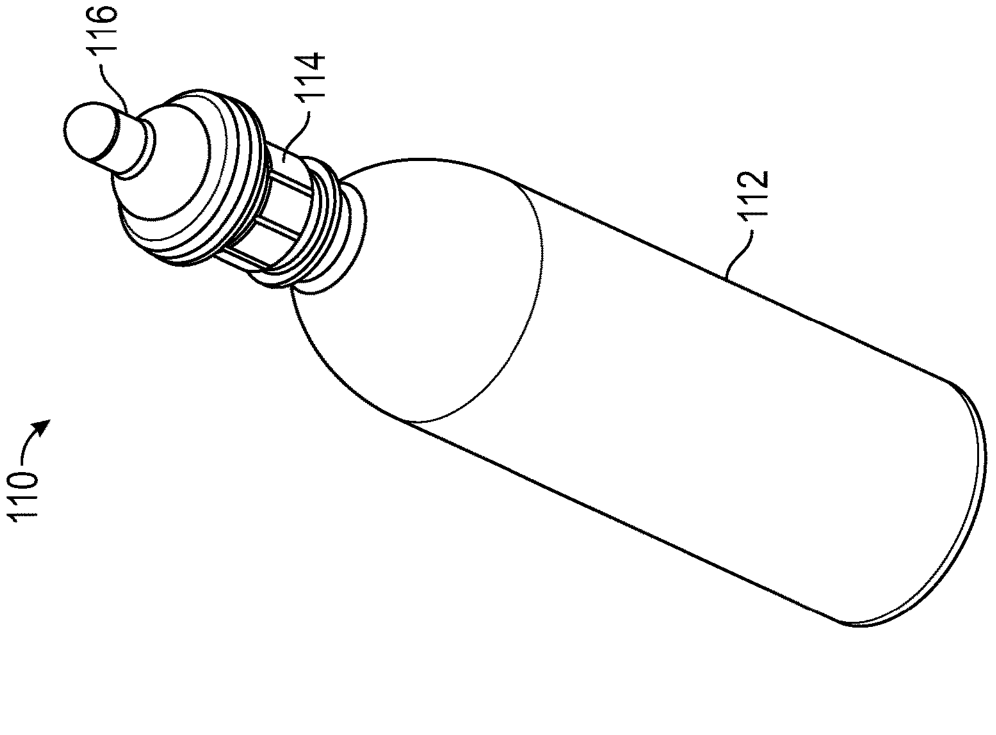
FIG. 13 is a front top isometric view of a baby bottle system according to the present disclosure.

Referring to FIGS. 13-14, wherein like numerals represent like elements, a baby bottle system 110 according to the present disclosure is shown secured to a water bottle 112. The baby bottle system 110 includes a collar 114 configured to connect to the water bottle 112, a nipple 116 secured to an upper end of the collar 114, and a dosing cap 118, shown in FIG. 24, configured to connect to the collar 114 and enclose the nipple 116 therein. The collar 114 includes an upper member 120 and a lower member 122 that connect to one another to secure the nipple 116 to the collar 114, as will be discussed in greater detail below. The water bottle 112 may be a commercially available disposable water bottle, such as those commonly available at grocery stores, convenience stores, fast food restaurants, vending machines and the like.

Figure 15:
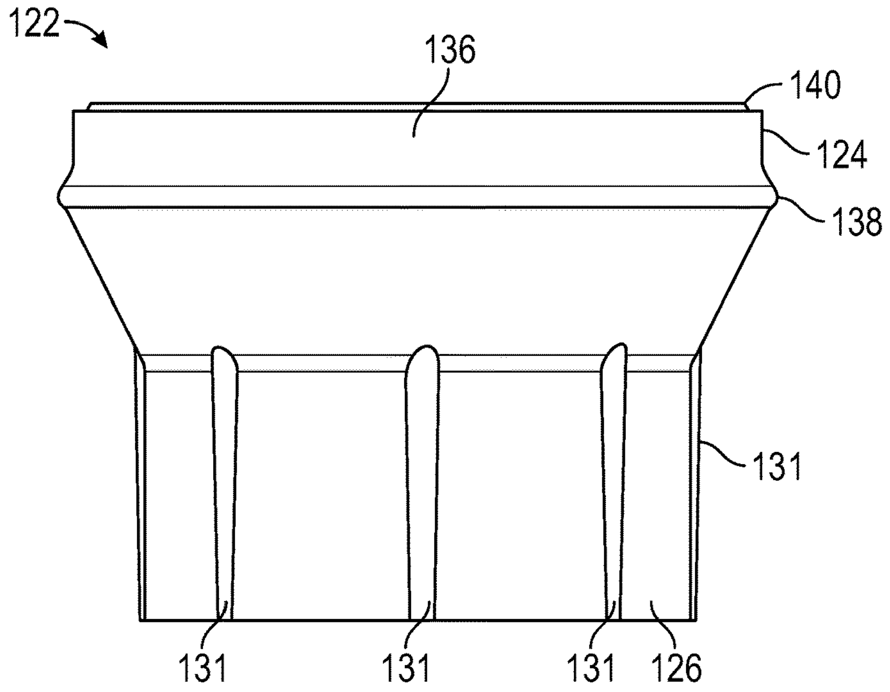
FIG. 15 is a front view of a lower collar member of the baby bottle system of FIG. 13.
Figure 16:
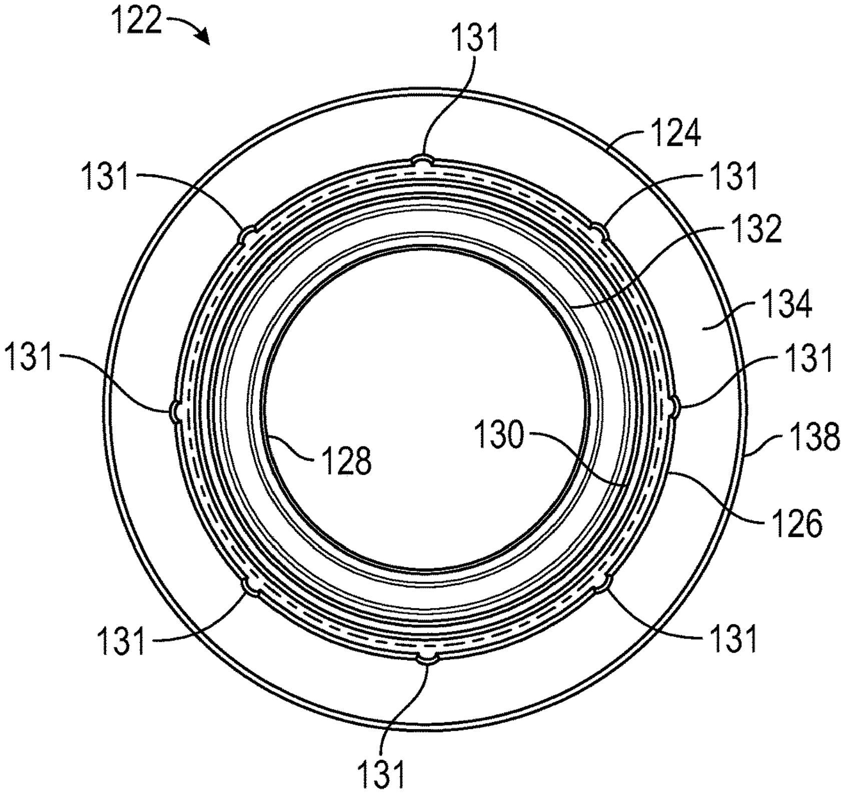
FIG. 16 is a bottom view of the lower collar member of FIG. 15.
Figure 17:
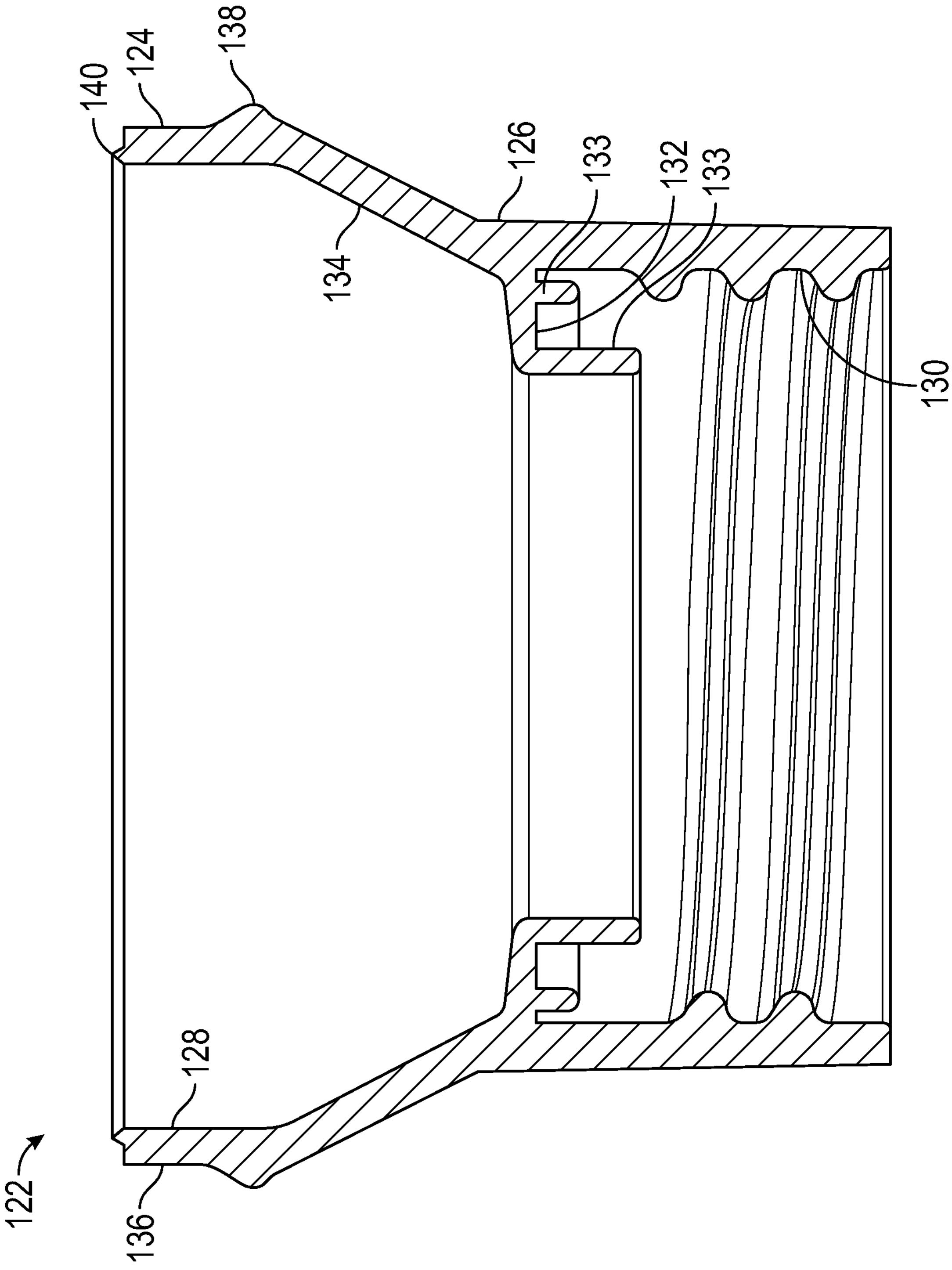
FIG. 17 is a front cross-sectional view of the lower collar member of FIG. 15.

Referring to FIGS. 15-17, the lower collar member 122 has a body including an upper ring 124 and a lower neck 126 extending downward from the upper ring 124. The upper ring 124 and lower neck 126 have interior surfaces that define a central passage 128 that extends through the body from the lower end to the upper end. As seen in FIG. 17, the interior surface of the lower neck 126 includes a female thread pattern 130 sized to correspond to a male thread pattern surrounding the mouth of the water bottle 112, shown in FIG. 14, which typically allows a cap to be secured to the water bottle 112 prior to purchase. The female thread pattern 130, thus, allows the lower collar member 122 to be screwed onto and attached to the water bottle 112. The outer surface of the lower neck 126 may include one or more gripping features 131 to facilitate twisting attachment of the lower collar member 122 to the water bottle 112. The lower neck 126 may also include a stop 132 at an upper end of the thread pattern 130 to facilitate proper engagement between the lower collar member 122 and the water bottle 112 when the lower collar member 122 is attached to the water bottle 112. The stop 132 may include walls 133 configured to sandwich the upper end of the water bottle 112 to provide a water tight seal between the water bottle 112 and the collar 114. The central passage 128 of the lower collar member 122 may include an outwardly angled transition region 134 between the female thread pattern 130 and the upper end of the body so that the opening of the central passage 128 at the upper end of the body is larger than the opening at the lower end of the body, the opening at the lower end of the body being defined by the mouth of the water bottle 112.

The upper ring 124 of the lower collar member 122 has a cylindrical outer surface 136 with a securing feature 138 disposed around the periphery of the outer surface 136. For instance, as illustrated, the securing feature 138 includes a circumferential ring projecting outwardly from the cylindrical surface 136. It should be readily understood by those skilled in the art that other types and numbers of securing features 138 are within the scope of the present disclosure. The upper ring 124 also includes a sealing projection 140 at an upper end thereof, the sealing projection 140 surrounding the opening of the central passage 128 at the upper end of the lower collar member 122.

Figure 18:
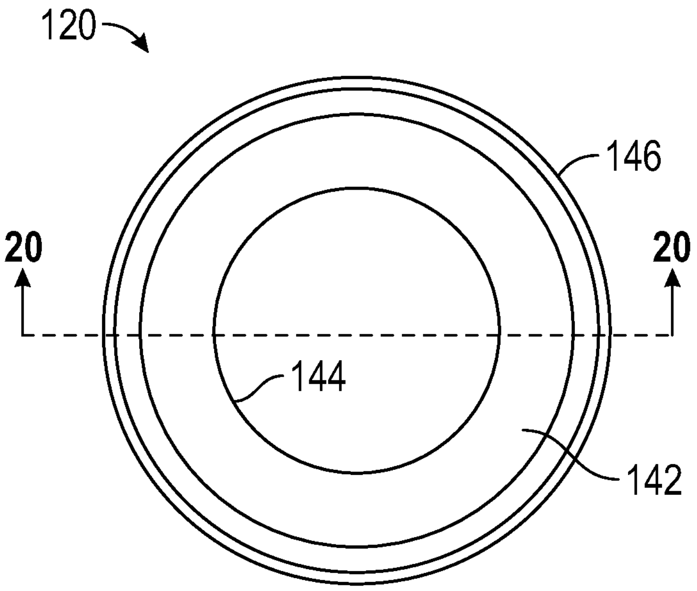
FIG. 18 is a top view of an upper collar member of the baby bottle system of FIG. 13.
Figure 19:
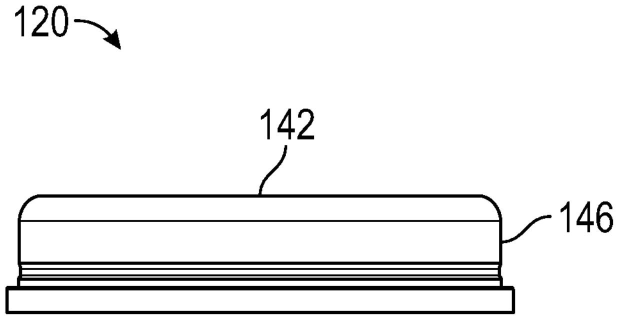
FIG. 19 is a front view of the upper collar member of FIG. 18.
Figure 20:
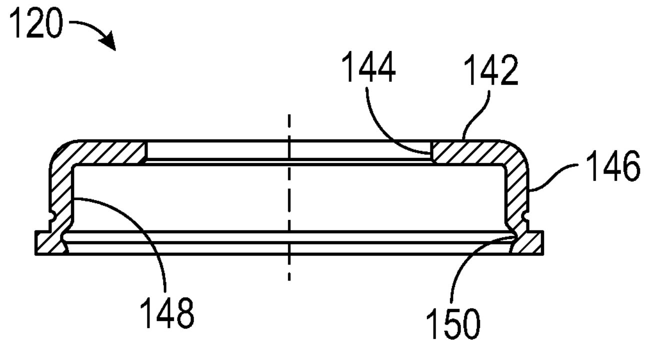
FIG. 20 is a front cross-sectional view of the upper collar member of FIG. 18.

Referring to FIGS. 18-20, the upper collar member 120 has a flat disc-shaped upper wall 142 with a central opening 144 extending therethrough, and a sidewall 146 extending downward from the upper wall 142 at the periphery thereof. The sidewall 146 includes a smooth inner surface 148 with a complementary securing feature 150 formed therein, the complementary securing feature 150 corresponding in form and number to the securing feature 138 of the lower collar member 122, shown in FIGS. 15-17. For instance, as illustrated, the complementary securing feature 150 includes circumferential indentation formed in the inner surface 148. It should be readily understood by those skilled in the art that other types and numbers of complementary securing features 150 are within the scope of the present disclosure.

Figure 21:
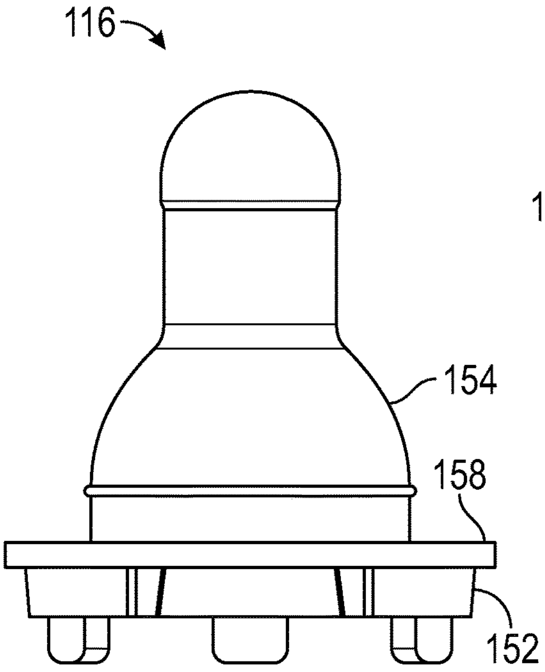
FIG. 21 is a front view of a nipple of the baby bottle system of FIG. 13.
Figure 22:
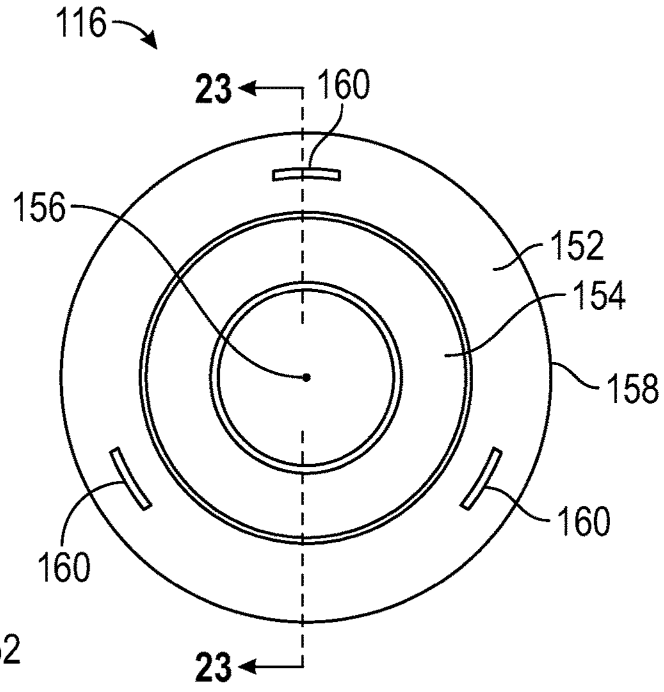
FIG. 22 is a top view of the nipple of FIG. 21.
Figure 23:
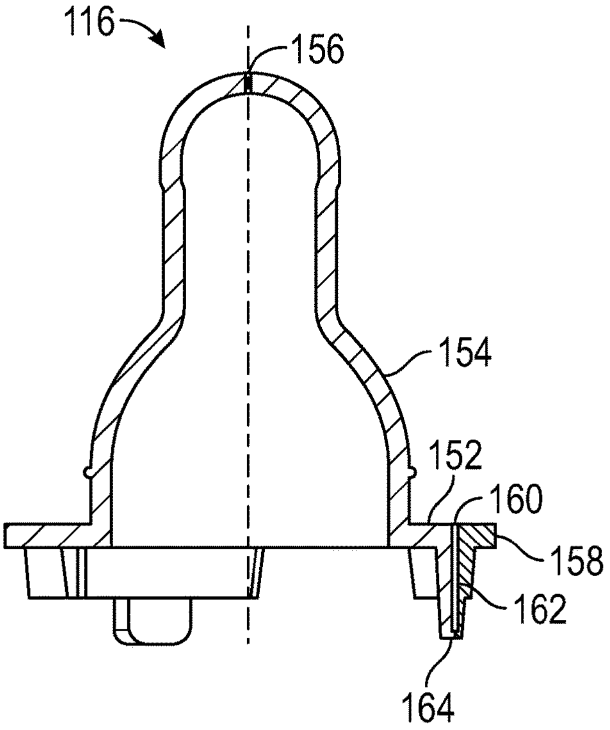
FIG. 23 is a left-hand side cross-sectional view of the nipple of FIG. 21.

Referring to FIGS. 21-23, the nipple 116 includes a base portion 152 and a sucking portion 154 and is formed of a flexible material as is known in the art of baby bottles. The sucking portion 154 is generally hollow and includes a passage 156 extending through a tip of the sucking portion 154 to allow fluid to be drawn through the passage 156 in response to sucking of the sucking portion 154, for example, by an infant or toddler. The base portion 152 includes a flat flange 158 extending outward from a base of the sucking portion 154. The base portion 152 also has at least one air vent 160 formed therethough and configured to allow air to pass through the nipple 116 and into the water bottle 112 during use while fluid is being drawn through the passage 156. For instance, as illustrated in FIG. 22, the base portion 152 may include three air vents 160 formed therethrough. The three air vents 160 may be formed as slits that are equally spaced about the sucking portion 154. As seen in FIG. 23, each air vent 160 may include a larger passage portion 162 on the exterior side and a smaller passage portion 164 on the interior side to inhibit or prevent fluid within the water bottle 112 from passing through the air vent 160.

Figure 24:
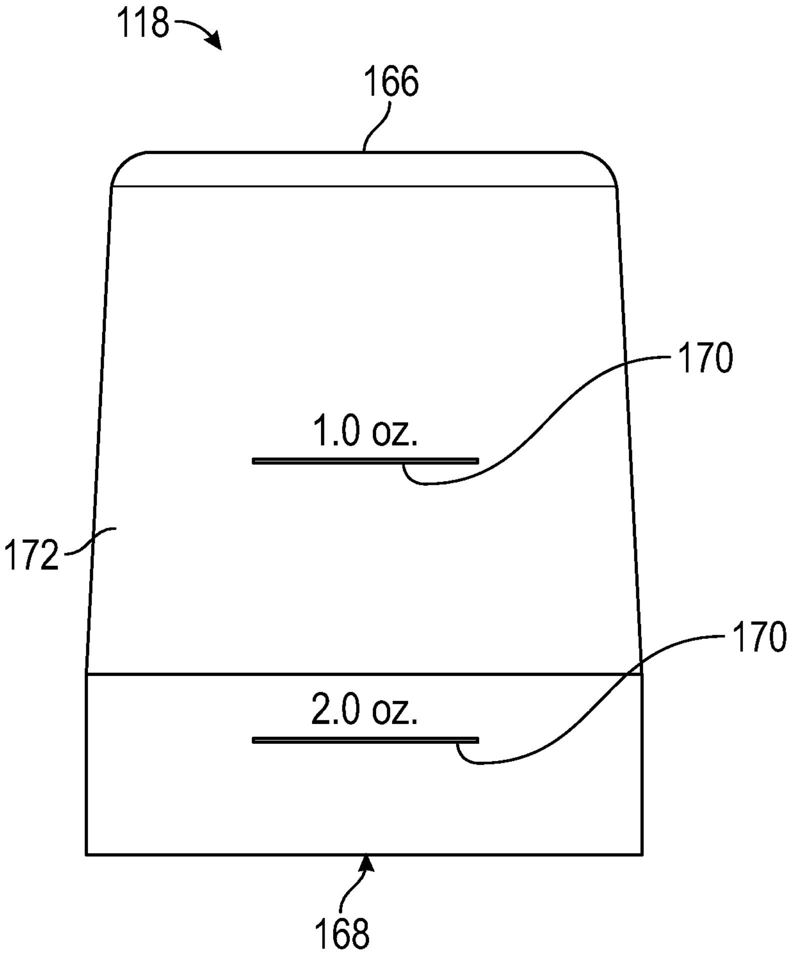
FIG. 24 is a front view of a dosing cap of the baby bottle system of FIG. 13.
Figure 25:
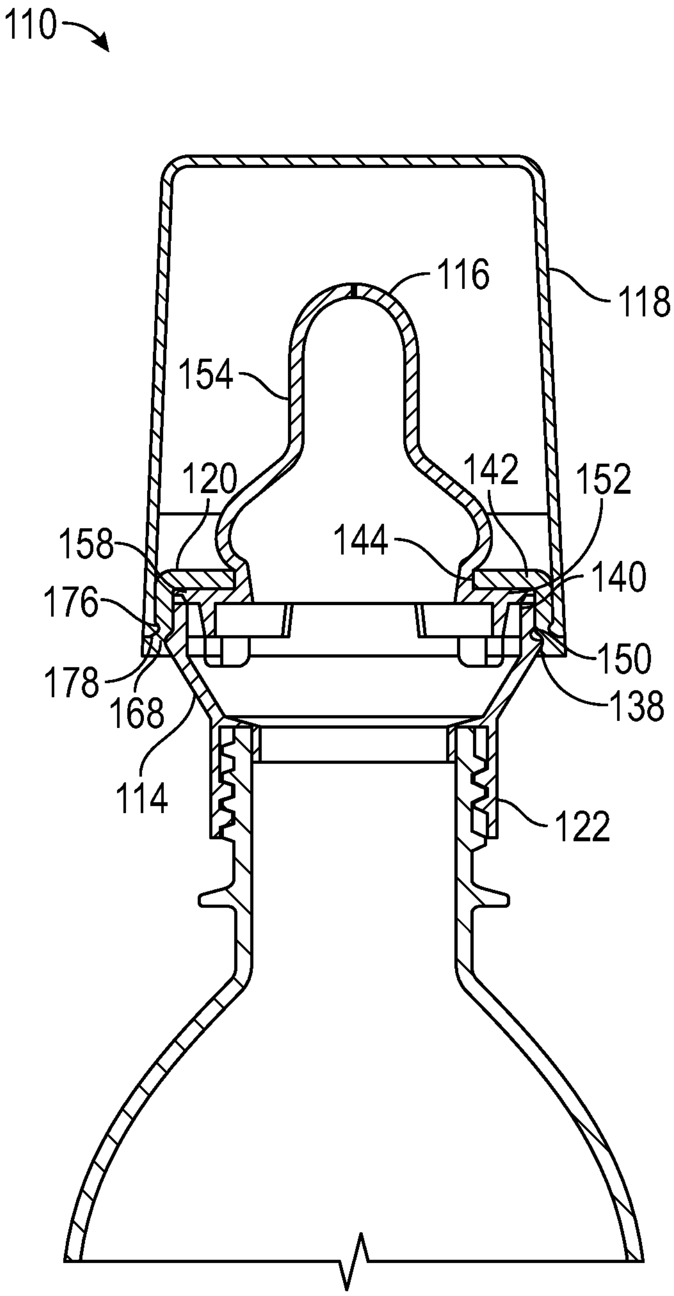
FIG. 25 is an enlarged cross-sectional view of a portion of the baby bottle system of FIG. 14.

Referring to FIG. 24, the dosing cap 118 has a hollow body 166 with an opening 168 at a bottom of the hollow body 166, thereby allowing the dosing cap 118 to function as a cup when inverted. The dosing cap 118 is preferably formed from a transparent or semi-transparent material and includes one or more volume gradations 170 marked on an outer surface 172 of the dosing cap 118, the one or more volume gradations 170 providing measurements of volume within the dosing cap 118 when the dosing cap 118 is inverted and functioning as a cup. Alternatively, the dosing cap may be made of a non-transparent material and/or the one or more volume gradations 170 may be marked on an interior surface of the dosing cap 118, with measurements being viewed through the opening 168. A portion of the interior surface of the dosing cap 118 is configured to slidingly engage an outer surface of the upper collar member 120 to enclose the nipple 116 therein. As shown in FIG. 25, the inner surface of the dosing cap 118 may include an engagement feature 176, such as an inwardly projecting circumferential ridge, proximate the opening 168 and configured to engage a corresponding engagement feature 178, such as a circumferential depression, formed on an outer surface of the upper collar member 120 of the collar 114.

Referring to FIG. 25, the baby bottle system 110 according to the present disclosure is assembled by passing the sucking portion 154 of the nipple 116 upward through the central opening 144 of the upper collar member 120 of the collar 114 until an upper surface of the base portion 152 of the nipple contacts the bottom surface of the upper wall 142 of the upper collar member 120. The lower collar member 122 is then inserted into the upper collar member 120 until the securing feature 138 on the lower collar member 122 engages the complementary securing feature 150 of the upper collar member 120, thereby securing the lower collar member 122 to the upper collar member 120. This sandwiches the flange 158 of the nipple 116 between the lower collar member 122 and the upper collar member 120 and causes the sealing projection 140 at the upper end of the lower collar member 122 to project into the flange 158 of the nipple 116, thereby securing the nipple to the collar 114. The dosing cap 118 slidingly engages an outer surface of the upper collar member 120, with the engagement feature 176 of the cap engaging the corresponding engagement feature 178 of the collar member 120, to enclose the nipple 116 therein.

The baby bottle system 10, 110 according to the present disclosure may be sold and/or provided as a pre-assembled unit. In operation, a user uses the baby bottle system 10, 110 in conjunction with a water bottle 12, 112 and baby formula (not shown) that may each be purchased and/or provided separately. The user removes the dosing cap 18, 118 and uses the dosing cap 18, 118 to measure and provide the proper mixture ratio of formula and water. This may be done by first removing a measured volume of water from the water bottle 12, 112, if necessary, to leave the water bottle 12, 112 with a volume of water that is more readily combinable with formula. For example, it may be desirable to remove a volume of water from the water bottle 12, 112 when an initial volume of water within the water bottle 12, 112 is not a round number of fluid ounces. Once an appropriate volume of water for easy combination with formula is left in the water bottle 12, 112, the dosing cap 18, 118 may then be used to measure formula for combination with the water and poured into the water bottle 12, 112. When the enough formula has been added to the water bottle 12, 112 to provide the proper mixture ratio, the baby bottle system 10, 110 may be secured to the water bottle 12, 112 by screwing the collar 14, 114 onto the threads surrounding the mouth of the water bottle 12, 112. The formula and water may then be mixed, for example, by shaking the water bottle 12, 112, and then fed to an infant or toddler in the same manner as any other similar baby bottle.

The baby bottle system 10, 110 according to the present disclosure advantageously overcomes the travel difficulties associated with traveling with milk or formula in conventional baby bottles. For instance, the baby bottle system 10, 110 avoids spoilage issues because formula is not mixed until immediately prior to use. Additionally, the baby bottle system 10, 110 avoids airport-screening delays because the traveler may travel with only the baby bottle system 10, 110 and dry formula, which do not require testing through airport security. The traveler may then simply purchase a commercially available water bottle after passing through security to feed their infant or toddler in the manner discussed above. The baby bottle system 10, 110 according to the present disclosure also takes up less space than a conventional baby bottle, thereby freeing up space within travel bags for other items.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A baby bottle system for delivering milk or baby formula comprising:

a collar having a lower end configured to connect to a water bottle;

a nipple secured to an upper end of the collar; and a dosing cap configured to connect to the collar and enclose the nipple, the dosing cap including one or more volume gradations providing measurements of volume within the dosing cap;

wherein the collar comprises:

a lower portion having threads configured to engage corresponding threads on the water bottle; and an upper portion attached to the lower portion;

wherein a base of the nipple is sandwiched between the upper portion and an upper end of the lower portion to secure the nipple to the collar;

wherein an outer surface of the lower portion includes at least one engagement feature, and an inner surface of the upper portion includes at least one complementary engagement feature, the at least one engagement feature and the at least one complementary engagement feature being configured to engage through linear insertion to connect the upper portion to the lower portion; and wherein the at least one engagement feature includes a plurality of projections each extending outward from the outer surface of the lower portion and each tapering towards the outer surface of the lower portion, and the at least one complementary engagement feature includes a plurality of indentations each formed in the inner surface of the upper portion and each tapering in a corresponding form such that each indentation is configured to receive a projection of the plurality of projections when upper portion is connected to the lower portion through linear insertion.

2. The baby bottle system according to claim 1, wherein the upper end of the lower portion includes a sealing projection that engages the base of the nipple to form a water-tight seal.

3. The baby bottle system according to claim 1, wherein the lower portion of the collar includes a bottle stop configured to sealingly engage an upper end of the water bottle when the lower portion is fully threaded onto the water bottle.

4. The baby bottle system according to claim 1, wherein an inner surface of the dosing cap includes an engagement feature formed proximate to an open end of the dosing cap, and an outer surface of the upper portion of the collar includes a corresponding engagement feature, the engagement feature and the corresponding engagement feature interacting to connect the dosing cap to the collar.

5. The baby bottle system according to claim 1, wherein the base of the nipple includes at least one vent configured to allow air to pass through the nipple and into the water bottle during use while fluid is being drawn through a passage of the nipple.

6. The baby bottle system according to claim 1, wherein the base of the nipple includes three vents each configured to allow air to pass through the nipple and into the water bottle during use while fluid is being drawn through a passage of the nipple.

7. The baby bottle system according to claim 6, wherein the three vents are equally spaced about a sucking portion of the nipple.

8. The baby bottle system according to claim 6, wherein each of the three vents includes a larger passage portion on an exterior side of the nipple and a smaller passage portion on an interior side of the nipple.

9. The baby bottle system according to claim 1, wherein the one or more volume gradations are provided in units of fluid ounces.

10. A baby bottle system for delivering milk or baby formula comprising:

a collar configured to connect to a disposable water bottle;

a nipple secured to the collar; and a dosing cap configured to connect to the collar and enclose the nipple, the dosing cap including one or more volume gradations providing measurements of volume within the dosing cap;

wherein the collar comprises:

a lower portion having threads configured to engage corresponding threads on the disposable water bottle; and an upper portion attached to the lower portion;

wherein a base of the nipple is sandwiched between the upper portion and an upper end of the lower portion to secure the nipple to the collar;

wherein an outer surface of the lower portion includes at least one engagement feature, and an inner surface of the upper portion includes at least one complementary engagement feature, the at least one engagement feature and the at least one complementary engagement feature being configured to engage through linear insertion to connect the upper portion to the lower portion; and wherein the at least one engagement feature includes a plurality of projections each extending outward from the outer surface of the lower portion and each tapering towards the outer surface of the lower portion, and the at least one complementary engagement feature includes a plurality of indentations each formed in the inner surface of the upper portion and each tapering in a corresponding form such that each indentation is configured to receive a projection of the plurality of projections when upper portion is connected to the lower portion through linear insertion.

11. The baby bottle system according to claim 10, wherein the upper end of the lower portion includes a sealing projection that engages the base of the nipple to form a water-tight seal.

12. The baby bottle system according to claim 10, wherein the lower portion of the collar includes a bottle stop configured to sealingly engage an upper end of the disposable water bottle when the lower portion is fully threaded onto the disposable water bottle.

13. The baby bottle system according to claim 10, wherein the one or more volume gradations are provided in units of fluid ounces.

14. A baby bottle system for delivering milk or baby formula comprising:

a nipple including a sucking portion and a base;

a collar attached to the base of the nipple and configured to be threadedly attached to a disposable water bottle; and a dosing cap configured to connect to the collar and enclose the nipple, the dosing cap including one or more volume gradations providing measurements of volume within the dosing cap;

wherein the collar comprises:

a lower portion having threads configured to engage corresponding threads on the disposable water bottle; and an upper portion attached to the lower portion;

wherein the base of the nipple is sandwiched between the upper portion and an upper end of the lower portion to secure the nipple to the collar;

wherein an outer surface of the lower portion includes at least one engagement feature, and an inner surface of the upper portion includes at least one complementary engagement feature, the at least one engagement feature and the at least one complementary engagement feature being configured to engage through insertion to connect the upper portion to the lower portion; and wherein the at least one engagement feature includes a plurality of projections each extending outward from the outer surface of the lower portion and each tapering towards the outer surface of the lower portion, and the at least one complementary engagement feature includes a plurality of indentations each formed in the inner surface of the upper portion and each tapering in a corresponding form such that each indentation is configured to receive a projection of the plurality of projections when upper portion is connected to the lower portion through linear insertion.

15. The baby bottle system according to claim 14, wherein the one or more volume gradations are provided in units of fluid ounces.

* * * * *